United States Patent Office 3,838,112
Patented Sept. 24, 1974

3,838,112
POLYAMIDES CONTAINING N-LOWER ALKYL 1,2,3-TRIAZOLE-4,5-DICARBONYL GROUPS
Allan Cairncross, Wilmington, Del., assignor to E. I. du Pont de Nemours and Company, Wilmington, Del.
No Drawing. Filed Dec. 26, 1972, Ser. No. 318,506
Int. Cl. C08g 20/20
U.S. Cl. 260—78 R          5 Claims

ABSTRACT OF THE DISCLOSURE

Polyamides made by reacting 1-, and 2-lower alkyl-1,2,3-triazole-4,5-dicarbonyl halides with diamines which are useful for making fibers and films.

FIELD OF THE INVENTION

This invention is concerned with novel polyamides containing N-alkyl 1,2,3-triazole rings.

THE PRIOR ART

Polyamides containing heterocyclic rings have been known heretofore. A review of the art has been given in Russ. Chem. Rev. 36, 926–932 (1961). Abshire and Marvel, Makromol. Chem., 44–46, 388–397 (1961) have reported polymers of the type

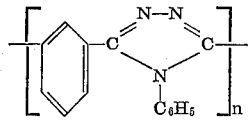

by condensation of m-phenylene-bis-tetrazole and N,N'-diphenylisophthalimide chloride, and

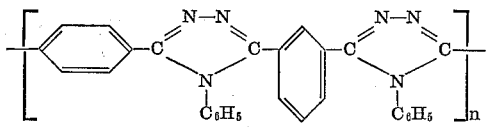

by condensation of p-phenylene-bis-tetrazole and N,N'-diphenylisophthalimide chloride. Nakajima et al., Makromol. Chem. 44–46, 388, 397 (1961) has taught copolymers of ε-caprolactam and 4-amino-1,2,4-triazole, and the deamination products thereof.

Heretofore no copolymer has been reported containing 1,2,3-triazole rings.

SUMMARY OF THE INVENTION

The polyamides of the present invention are characterized by repeating units —A–E— wherein A is a diketo group derived from at least one N-loweralkyl 1,2,3-triazole-4,5-dicarbonyl halide and E is at least one divalent diamine radical of up to 18 carbon atoms derived from a diamine capable of polycondensation with a diacid chloride, and $n$ is the degree of polymerization, said polymers having an inherent viscosity of at least 0.5 and preferably from 1.5 to 10, measured at 0.1% concentration in m-cresol at 25° C.

DETAILED DESCRIPTION OF THE INVENTION

The present invention is directed to polyamides generally prepared by interfacial polymerization of organic diamines with an N-loweralkyl-1,2,3-triazole-4,5-dicarbonyl chloride of the formula

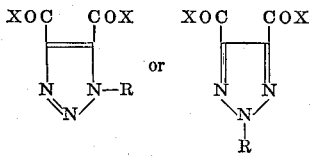

wherein R is a lower alkyl group and X is halogen, preferably chlorine.

The diamines can be any of the diamines conventionally employed to make polyamides. Incorporated by reference are the diamines recited in U.S. Pat. 3,664,986.

Particularly preferred are cyclic diamines of the formula

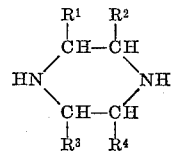

wherein $R^1$, $R^2$, $R^3$ and $R^4$ are each selected from hydrogen or lower alkyl.

The polymers are prepared by reacting the diamines with the acid halide by either interfacial or solution polymerization at temperatures ranging from −20° C. to 100° C., and preferably at about ambient temperatures. Copolymers can be prepared by using mixtures of three or more difunctional components. If desired, monofunctional components may be added in small amounts to the reactants to reduce the molecular weight of the products.

Preparation of 1,2,3-triazole-4,5-dicarbonitrile

A mixture of 108 g. (1 mol) of diaminomaleonitrile, 69 g. (1 mol) of sodium nitrite and 1200 ml. of water was stirred at 5–10° C. while 1 mol of aqueous hydrochloric acid was added dropwise. The resulting solution was warmed to 50° C., treated with activated carbon and filtered. The filtrate was extracted with three portions of ether: 1000 ml., 800 ml. and 600 ml. The combined ether extracts were dried over magnesium sulfate and evaporated to dryness to yield 115 g. of nearly colorless crude product. Half of this product was dissolved in 1400 ml. of boiling toluene, treated with activated carbon, filtered hot, and the filtrate slowly cooled to 0° C. The white needles which formed were washed in cold toluene and dried under vacuum over $P_2O_5$ to obtain 50 g. of purified 1,2,3-triazole-4,5-dicarbonitrile melting at 145–147° C.

Preparation of 1- and 2-methyl-1,2,3-triazole-4,5-dicarbonitrile

To 152.7 g. (1.282 moles) of 1,2,3-triazole-4,5-dicarbonitrile and 1250 ml. of water was carefully added 186 g. (1.75 moles) of sodium bicarbonate. The solution was warmed to 50 to 60° C. and 186 ml. of dimethylsulfate was slowly added with efficient stirring over a period of half an hour. The mixture was stirred another hour, cooled, and extracted with ethyl acetate. The ethyl acetate solution was dried over magnesium sulfate and concentrated to an oily residue. Dilution with cold carbon tetrachloride and filtering removed any hydrolysis products. Distillation gave 115.3 g. (67.7% yield) of an approximately 2:1 mixture of 2-methyl- and 1-methyl-1,2,3-triazole-4,5-dicarbonitrile boiling at 70° C./0.08 mm. and 85° C./0.08 mm., respectively.

The 1- or 2-methyl-1,2,3-triazole-4,5-dicarbonitrile can be converted to the acids by hydrolysis with aqueous potassium hydroxide and isolated as the monopotassium salt. Refluxing with thionyl chloride, preferably with added dimethylformamide catalyst, then yields the corresponding diacid chlorides.

SPECIFIC EMBODIMENTS

The following examples are presented to illustrate the invention but are not intended to fully delineate its scope.

EXAMPLE 1

Trans-2,5-Dimethylpiperazine/2-Methyl-1,2,3-triazole-4,5-dicarbonyl Chloride Polyamide

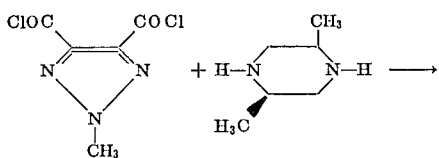

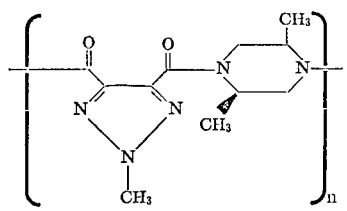

A glass water-jacketed blender was charged with 6.46 g. (0.0567 mole) of trans-2,5-dimethylpiperazine, 0.1000 mole of sodium hydroxide (standard commercial sample in 52 ml. of water), 118 ml. of water (total 170 ml.), and 30 ml. of alcohol-free chloroform and cooled to 14° C. To the rapidly stirred mixture was added a solution of 10.40 g. (0.0500 mole) 2-methyl-1,2,3-triazole-4,5-dicarbonyl chloride in 35 ml. of dry alcohol-free chloroform. Almost immediately, the mixer slowed and vibrated due to formation of a ball of polymer. After 6 min. stirring was stopped, the internal temperature was 22° C. and the solution was pH 7. At this point the polymer was soluble in aqueous acetone and aqueous methanol. The mixture was dried under an air stream, largely dissolved in 1 part methanol, and poured into 3½ liters of methanol precipitating the polymer. The white solid was filtered, rinsed 7 times with water, twice with methanol, and dried in a vacuum oven at 80° C. (5 mm.) overnight to give 7.57 g. (60.8%) polymer. For analysis it was further dried at 175° (0.1 mm.). *Stick point* on hot bar 300° C., darkens slightly 315° C.

Anal.—Calcd. for $C_{11}H_{15}N_5O_2$: C, 53.00; H, 6.07; N, 28.10. Found: C, 52.15; H, 6.10; N, 28.08.

Inherent viscosity: 25° C., 0.1% in m-cresol $\eta_{inh}=6.07$
Differential Thermal Analysis: $T_g$ 238° C., no melt before decomposition.
Thermal Gravimetric Analysis (air):250° C. no loss, 300° (½%), 398% (5%), 431° (50%).
Differential Scanning Calorimetry: $T_g$ 230° C.
UV: Only end absorption.
IR: Amide and C=N bands, surprisingly still an —OH band.
X-ray: Amorphous.
Density: 1.3100.
Film: A solution of 4 g. in 55 ml. of chloroform was pressured through an 0.8 micron silver filter and cast on a chrome plate using a 0.035 knife to give a clear, tough 1.6 mil film.

The following data were determined on the films.

| | Tensile strength, p.s.i. | Elongation, percent | Modulus, p.s.i. |
| --- | --- | --- | --- |
| As cast | 8,720 | 8.8 | 216,670 |
| 4× draw, 236° C | 10,420 | 9.2 | 194,440 |
| 200° C., air, 24 hr | 8,910 | 5.6 | 112,250 |

Hot draw: Draws 4× at 236° C. but shrinks back to original size in boiling water. Draws 4× at 300° C. withuot necking down, after which it does not shrink in boiling water.

Electrical Properties (1.64 mil film, 50% rel. humidity)

| | 23° C. | 180° C. |
| --- | --- | --- |
| Dielectric constant ($10^3$ kHz.) | 4.54 | 3.34 |
| Dissipation factor ($10^3$ kHz.) | .00372 | .02082 |
| Loss factor | .01682 | .06947 |
| Volume resistivity: | | |
| (1 inch) | $1.4 \times 10^{15}$ | $8.9 \times 10^{12}$ |
| (½ inch) | $1.7 \times 10^{15}$ | $1.7 \times 10^{12}$ |
| Dielectric strength (kv./mil.) | 3.3 | |

A film was pressed at 375° C. that was clear and slightly yellow.

Water Absorption (wet basis): 15.3% at 65% R.H. and 20.7% at 100% R.H.

Moisture Regain (dry basis): 9.43% at 65% R.H. and 33.89% at 100% R.H.

EXAMPLES 2–4

The molecular weight of the polyamide from trans-2,5-dimethylpiperazine and 2-methyl-1,2,3-triazole-4,5-dicarbonamide can be reduced by addition of benzoyl chloride during the polymerization. This permits higher solid contents in solutions for film casting or fiber spinning. Examples 2–4 in which the dicabonyl chloride was taken from the same batch as Example 1 were carried out following the procedure of Example 1 with the indicated amount of benzoyl chloride being added along with the dicarbony chloride.

| Ex. | Mole percent $C_6H_5COCl$ (based on dicarbonyl chloride) | $\eta_{inh}$ (0.1% m-cresol) 25° C. | Solution (8.4% solids) tetrachloroethane |
| --- | --- | --- | --- |
| 2 | None | 5.26 | Gel. |
| 3 | 4.3 | 2.30 | Suitable viscosity for dry spinning. |
| 4 | 8.6 | 1.56 | Too thin for dry spinning. |

EXAMPLE 5

Polyamide from p-Phenylenediamine and 2-Methyl-1,2,3-triazole-4,5-dicarbonyl Chloride

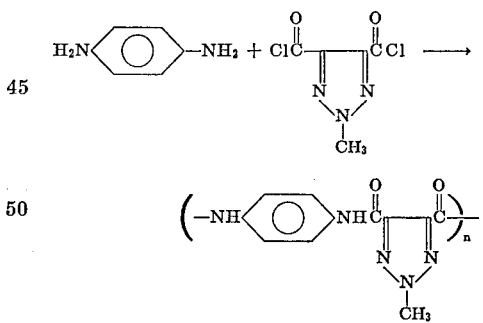

As a solution of 5.40 g. (0.050 mole) of p-phenylenediamine in 100 ml. of hexamethylphosphoramide (distilled over calcium hydride) was stirred in an ice bath, 10.40 g. (0.050 mole) of 2 - methyl-1,2,3-triazole-4,5-dicarbonyl chloride was added in three approximately equal portions over a five-minute period. The temperature varied from 3° to 15° C. Stirring was continued for two hours as a cream colored precipitate came down. The system was allowed to stand overnight as the ice bath melted and the polymer was isolated by pouring the slurry into water, filtering, and washing five times in a blender with water. It was dried at 80° C./5 mm. overnight. Its weight was 11.1 g. The polymer softened at 350° C. on a metal block but did not stick to it or melt.

Its X-ray powder pattern has a medium sharp band at 9.50 A. and two broad, diffuse bands at 3.42 A. and 6.16 A. Its TGA air weight losses were 5% at 412° C. and 50% at 514° C. It is insoluble in sulfuric acid, hexafluoroisopropanol, chloroform, acetone, m-cresol, dimethyl acetamide, and hexamethylphosphoramide.

Infrared absorption corresponded to the above structure with 2.95μ and 3.06μ for NH; 3.30μ for =CH; 3.37μ for saturated C—H; 5.90μ, 6.00μ, 6.11μ, 6.18μ and 6.60μ related to carbonyl, aromatic C=C, C=N, and amide II; 12.03μ indicates p-substitution.

EXAMPLE 6

Polyamide from 1-Methyl-1,2,3-triazole-4,5-dicarbonyl Chloride and trans-2,5-Dimethylpiperazine

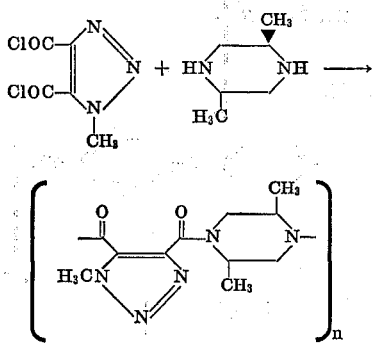

A solution of 10.40 g. of 1-methyl-1,2,3-triazole-4,5-dicarbonyl chloride in 35 ml. of dry, alcohol-free chloroform was added to a rapidly stirred mixture of 6.46 g. of trans-2,5-dimethylpiperazine, 0.1000 mole of NaOH, 170 ml. of water, and 30 ml. of alcohol free chloroform in a jacketed cooled (0° C.) blender. After 6 to 7 minutes a pint of acetone was added and the polymer was filtered, washed 7 times with water, 2 times with acetone, and dried overnight at 80° C. (5 mm.) to give 8.9 g. white solid polyamide.

Anal.—Calcd. for $C_{11}H_{15}N_5O_2$: C, 53.00; H, 6.07; N, 28.10. Found: C, 52.62; H, 6.44; N, 28.31, 28.48.

Inherent viscosity (0.1% m-cresol, 25° C.): 3.01

Thermal gravimetric analysis (air, 6°/min.): 5% loss 362° C., 50% 419° C.

Differential thermal analysis: $T_g$ 282° C., no $T_m$ evident. On a gradient bar it sticks at 350° C.

The polymer dissolved (7%) in chloroform and the clear colorless solution was drawn quickly up into the air to give a long fiber as the solvent evaporated. A film was also cast from the solution.

Infrared absorption was characteristic for polyamide: Sat. CH at 3.30μ, 3.36μ, 3.44μ, carbonyl at 6.07μ and 6.13μ, C=N and C=C at 6.39μ.

EXAMPLE 7

Poly(trans-2,5-dimethylpiperazine/1- and 2-Methyl-1,2,3-triazole-4,5-dicarbonamide)

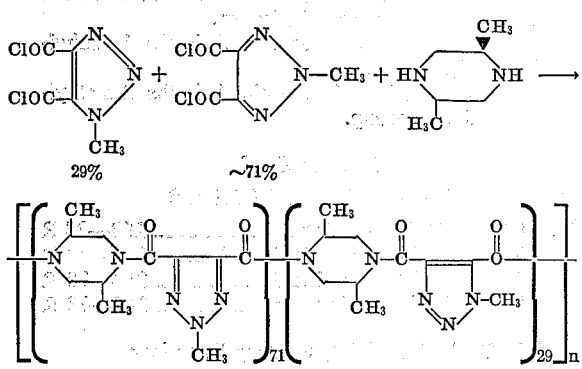

In the manner of examples 1 and 3 above, a 29:71 mixture of the 1-methyl- and 2-methyl-1,2,3-triazole-4,5-dicarbonyl chloride was polymerized with trans-2,5-dimethylpiperazine to give a copolyamide with an inherent viscosity of 2.63 (0.1% in m-cresol at 25° C.), a glass transition temperature of 247° C. (differential scanning calorimetry).

Spinning of Poly(trans-2,5-dimethylpiperazine/1- and 2-Methyl-1,2,3-triazole-4,5-dicarbonamide)

Two interfacial polymerizations, as above, of trans-2,5-dimethylpiperazine and a 29/71 mixture of 1- and 2-methyl-1,2,3-triazole-4,5-dicarbonyl chloride gave copolyamides with inherent viscosities of 1.75 and 1.82. A twenty-five gram mixture of these samples was dissolved in 100 ml. of 1,1,2-trichloroethane. This solution was dry spun into filaments. After being dried at 80° C. in a nitrogen-filled oven for two days then at 80° C. under vacuum for one day, the filaments were tested with the following results, which are the averages of ten determinations for each physical characterization:

Tensile—0.52 g./denier
Elongation—3.0%
Modulus (initial)—25.7 g./denier
Work Recovery:
    53.368 at 2.019% elongation
    37.520 at 3.022% elongation
Tensile Recovery:
    74.969 at 2.019% elongation
    60.268 at 3.022% elongation These data show that this copolyamide is useful for spinning into fibers and weaving into fabrics.

EXAMPLE 8

Copolyamide from trans-2,5-Dimethylpiperazine, 2-Methyl-1,2,3-triazole-4,5-dicarbonyl Chloride and 1,2,5-Thiadiazole-3,4-dicarbonyl Chloride

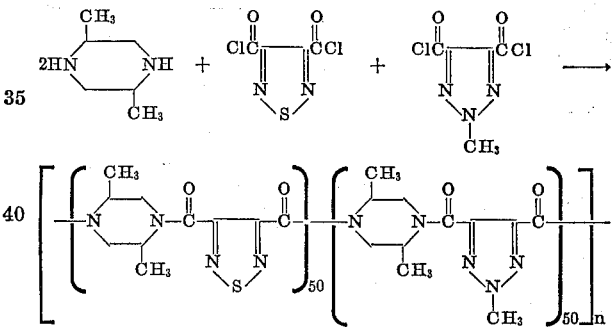

In an ice-water cooled, jacketed blender a mixture of 12.92 g. (0.1134 mole) of trans-2,5-dimethylpiperazine, 8 g. (0.2 mole) of sodium hydroxide dissolved in 100 ml. of aqueous solution, 240 ml. of water, and 60 ml. of methylene chloride was stirred rapidly at 8° C. as a solution of 10.55 g. (0.05 mole) of 1,2,5-thiadiazole-3,4-dicarbonyl chloride, 10.40 g. (0.05 mole) of 2-methyl-1,2,3-triazole-4,5-dicarbonyl chloride in 70 ml. of molecular sieve-dried methylene chloride was added rapidly. As stirring was continued for 5 minutes, the temperature rose to 27° C. The supernatant liquid was decanted, the polymer coagulated with acetone, then washed 5 times with water in a blender and once with acetone. The white copolyamide after being dried at 80° C./5 mm. overnight weighed 20.5 g. and was found to have an inherent viscosity of 5.00 (0.1% in m-cresol at 25° C.) and a glass transition temperature of 240° C. (differential scanning calorimetry).

Anal.—Calcd. for $C_{21}H_{27}N_9O_4S$: C, 50.30%; H, 5.39%; N, 25.15%; S, 6.39%. Found: C, 49.02%, 48.88%; H, 5.43%, 5.35%; N, 24.58%; S, 6.53%.

Its thermogravimetric weight losses in air were 5% at 419° C., 50% at 445° C. It was soluble in chloroform, 1,1,2 - trichloroethane, dimethylformamide. Brilliantly clear, tough films cast from chloroform were found to have a volume resistivity of $5.2 \times 10^{15}$, a dielectric constant at 23° C. of 5.11 and a dissipation factor at 23° C. of 0.003. These electrical properties show that this polymer is useful as an insulator film.

Using the procedure of Example 1, polyamides can be obtained by reacting the diacid chlorides and diamines shown in Table I.

TABLE I

| Diacid chloride | Diamine | Product |
|---|---|---|

(See structural formulas in original table)

The embodiments of the invention in which an exclusive property or privilege is claimed are defined as follows:

1. A polyamide consisting essentially of repeating units of the formula

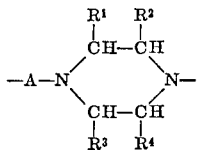

wherein
A is an N-lower alkyl 1,2,3-triazole 4,5-dicarbonyl group, and
$R^1$, $R^2$, $R^3$ and $R^4$ are each hydrogen or lower alkyl, said polymer having an inherent viscosity of 0.5 to 10 measured at 0.1% concentration in m-cresol at 25° C.

2. A polymer of claim 1 wherein the inherent viscosity is from 1.5 to 10.

3. A polymer of claim 2 wherein $R^1$ and $R^4$ are each methyl and $R^2$ and $R^3$ are each hydrogen.

4. A polymer of claim 3 wherein A is the 1-methyl-1,2,3-triazole-diketo group.

5. A polymer of claim 3 wherein A is the 2-methyl-1,2,3-triazole-diketo group.

References Cited

UNITED STATES PATENTS

| | | | |
|---|---|---|---|
| 3,376,268 | 4/1968 | Preston | 260—78 R |
| 3,575,934 | 4/1971 | Rosendahl et al. | 260—78 R |
| 3,664,986 | 5/1972 | MacDonald | 260—78 R |
| 3,753,956 | 8/1973 | Tuites et al. | 260—78 R |

HAROLD D. ANDERSON, Primary Examiner

U.S. Cl. X.R.

260—32.6 N, 32.8, 33.4 R, 33.8 R, 47 CZ, 78 S, 308 A